United States Patent [19]
Hilton

[11] Patent Number: 4,762,968
[45] Date of Patent: Aug. 9, 1988

[54] EMERGENCY CUT OFF DEVICE

[75] Inventor: David Hilton, 13220 Night Owl La., Palm Beach Gardens, Fla. 33418

[73] Assignee: David Hilton, Palm Beach Gardens, Fla.

[21] Appl. No.: 96,905

[22] Filed: Sep. 15, 1987

[51] Int. Cl.$^4$ .................. H01H 35/00; H01H 17/08; G08B 23/00

[52] U.S. Cl. .................. 200/52 R; 200/DIG. 2; 200/161; 340/573; 340/687

[58] Field of Search ..... 200/52 R, 61.19, 61.76–61.80, 200/61.93, 153 M, 159 R, 161, DIG. 2; 340/687, 573–575; 180/271, 279, 282, 283, 289, 316, 333; 123/198 D–198 DC

[56] References Cited

U.S. PATENT DOCUMENTS

| | | | |
|---|---|---|---|
| 1,077,877 | 11/1913 | Fitch | 200/61.79 |
| 2,407,439 | 9/1946 | Olson | 200/61.76 |
| 2,804,159 | 8/1957 | Gavito | 180/289 |
| 3,210,494 | 10/1965 | Murdock | 200/61.19 |
| 3,681,610 | 8/1972 | Pratt | 180/279 X |
| 3,726,264 | 4/1973 | Lariviere | 200/161 X |
| 3,760,134 | 9/1973 | McCray | 200/52 R |
| 3,769,481 | 10/1973 | Raab | 200/161 |
| 3,821,504 | 6/1974 | Schomaker et al. | 200/52 R |
| 3,849,612 | 11/1974 | Cobb et al. | 200/61.19 X |
| 4,037,683 | 7/1977 | LeBell | 200/52 R X |
| 4,262,180 | 4/1981 | Walter | 340/574 X |
| 4,542,373 | 9/1985 | Hillock | 340/687 |

Primary Examiner—J. R. Scott
Attorney, Agent, or Firm—Steele, Gould & Fried

[57] ABSTRACT

A dual acting safety switch for a land or marine vehicle which disables the ignition circuit of the engine by removal of a cord held holding member and closes the circuit of a secondary circuit to activate an alarm device.

8 Claims, 1 Drawing Sheet

U.S. Patent Aug. 9, 1988 4,762,968
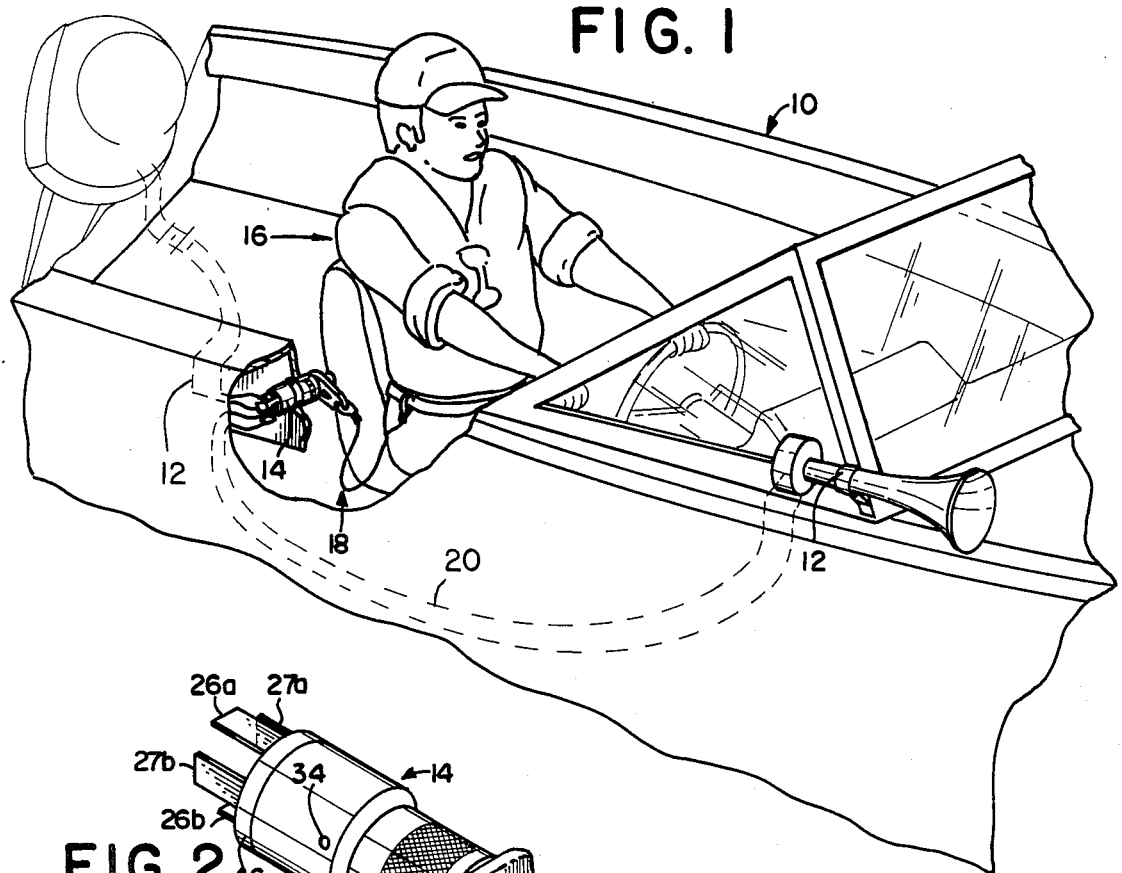
FIG. 1
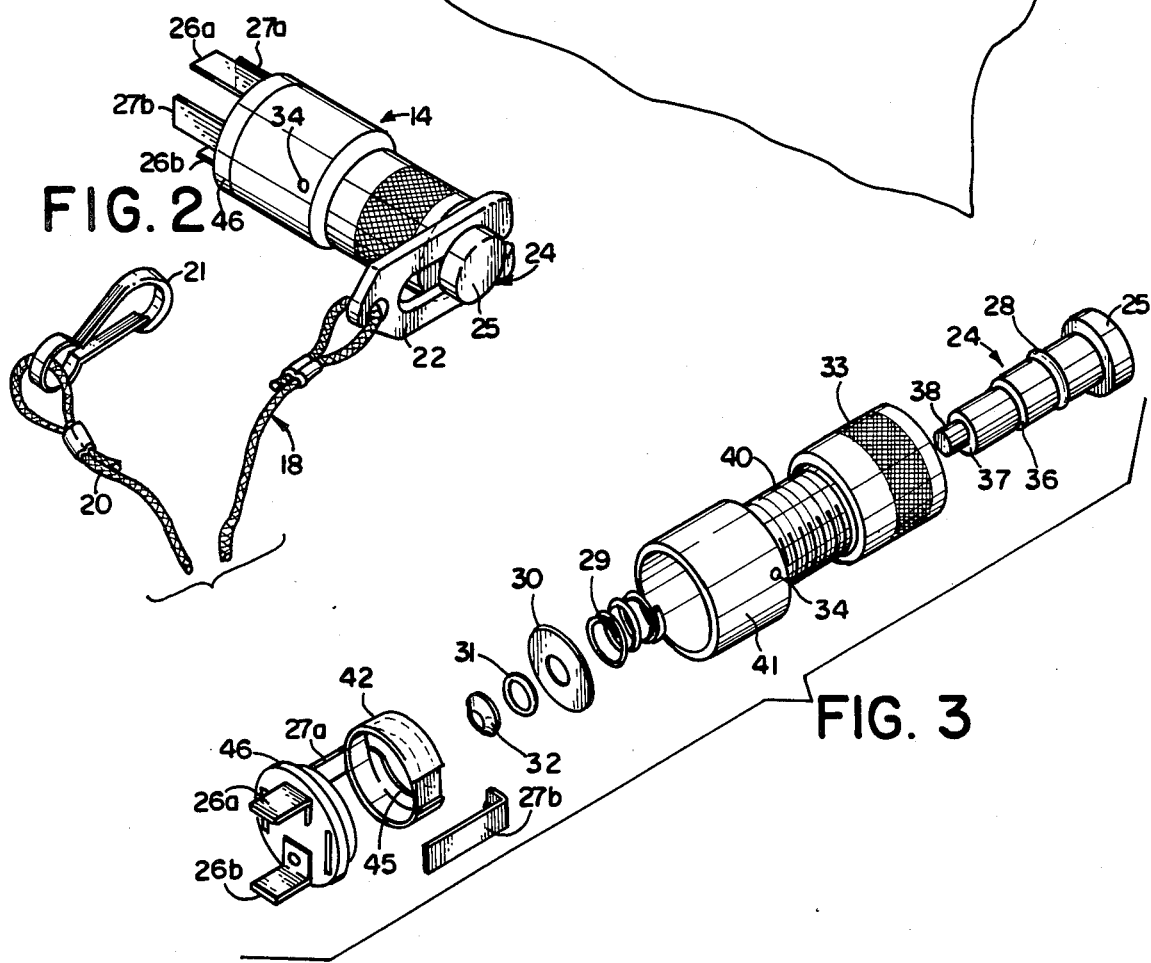
FIG. 2
FIG. 3

EMERGENCY CUT OFF DEVICE

FIELD OF THE INVENTION

The invention relates to an emergency switch for cutting off power from land and marine vehicles. More particularly, the invention is concerned with a dual action emergency switch which cuts off power from a land and marine vehicle and activates a further functional means, including audio and visual devices.

BACKGROUND OF THE INVENTION

Single function emergency switches are well known for use with land and marine vehicles. The switches are used in many cases only to disconnect power when the vehicle operator accidently leaves the vehicle. In such cases, the operator may be unable to communicate to others for assistance or of his difficulties. If the operator is in the water he may be hit by other boats or his boat may be rammed if the boat lights are not on or other signals displayed.

Various types of lightweight, open vehicles, such as snowmobiles, dune buggies and the like are used in rather rugged, often hilly, wooded terrain where hidden obstacles are frequent. Because of this fact and the rather carefree way in which these vehicles tend to be used, spills and other accidents frequently occur. In the event of an accident, the operator is likely to be thrown from the vehicle, with the motor running and in gear. It is obvious that the fact that the motor is running and the vehicle under power creates an added unnecessary safety hazard, both to the operator and to persons in the neighborhood. Even if no one is injured, the vehicle is liable to be seriously damaged or at least to run some distance before it comes to a stop.

The fact that the operator is no longer holding the throttle open doesn't materially diminish the problem as the vehicle can run an appreciable distance when in gear, especially if the engine has a high idle speed or if it is choked as may be the case in cold water. Moreover, carburetor icing in cold damp weather can freeze the throttle in an open position after a long run at a steady speed, allowing the vehicle to continue on out of control after an accident.

Another example of a kind of hazard which the invention will alleviate occurs because many lightweight vehicles do not have a clutch and start moving as soon as the brake is released. This tends to produce "jerk" starts which may throw an unwary operator backwards with the result that he loses control of the vehicle, which may run into something before the operator recovers.

Other examples of extremely hazardous situations which are created by small power tools, lawnmowers, tractors, and the like when an operated loses control will occur to anyone having experience with that kind of equipment.

U.S. Pat. No. 3,210,494 to Murdock, which is herein incorporated by reference, discloses an emergency cut off device for an engine of a vehicle which contains a contact establishing means between a circuit disabling position, a circuit closing position and a reset position. The contact establishing means disables the operation of the engine when the operator has moved away a predetermined distance.

U.S. Pat. No. 3,654,411 to Wohnlich et al disclose a breakaway switch for a trailer that is intended to activate an electrical circuit to apply the trailer brakes or give a signal upon separation of the trailer from the towing vehicle.

U.S. Pat. No. 3,726,264 to Lariviere, which is herein incorporated by reference, discloses a safety stopping device for marine vehicles and employs a cord connected at one end to the pilot of the boat and at its other end to the safety device for the grounding of the ignition circuit of the engine either by operating a push button or by ripping off the cord held between the push button and a retaining head traversing the button. There is provided a stem which is capable by axial movement to connect two fixed contact terminals interposed in the ignition switch.

Besides being monofunctional, the prior art switches are known to corrode when used in wet environments especially when sea water is retained within the switch over a period of time.

SUMMARY OF THE INVENTION

The present invention provides an emergency cut off switch for disabling operation of power plants of vehicles by circuit breaking and substantially simultaneously performing a contact making operation to activate accessory electrical devices. More particularly, the invention provides a dual acting switch having a member normally making contact to complete a circuit between an electrical source and a motor which breaks contact in an emergency situation by an operator. Upon breaking contact the switch member makes operational contact with another circuit to complete the second circuit and activate another functional apparatus including an audio or visual device.

The emergency switch of the invention comprises an enclosure housing having a contact establishing means mounted therein which is normally maintained in a first circuit making position at one end against the resistance of a spring means. Holding means is provided which maintains the contact establishing means in the first circuit making position which permits operation of the vehicle. Removal of the holding means causes a spring means to urge the contact establishing means out of the first circuit making position into a second circuit making position which completes a circuit for a secondary safety means such as an audio or visual means or the like.

Advantageously, the switch of the invention is provided with drain means so as to prevent the accumulation of water which can lead to corrosion.

It is an object of the invention to provide an emergency power cut off switch which is dual functional.

It is a further object of the invention to provide a emergency power cut off switch which activates a further operating device while deactivating a primary power plant.

It is another object of the invention to provide an emergency power cut off switch for a vehicle which can activate an audio or visual device when the power or vehicle operation is cut off.

It is yet another object of the invention to provide a means for cutting off the power of a marine vehicle when the operator accidentally leaves the vehicle and activates a distress signal or notices the location of the vehicle.

It is a yet still further object of the invention to provide an emergency cut off device which does not hold water that may corrode the switch.

It is another object of the invention to provide an emergency cut off switch which can be quickly assembled or disassembled, that is rugged in construction, simple in design and dependable in breaking and making circuits.

Other objects and a fuller understanding of the invention will be had by referring to the following description and claims of a preferred embodiment, taken in conjunction with the accompanying drawings, wherein like reference characters refer to similar parts throughout the several views.

BRIEF DESCRIPTION OF THE DRAWINGS

FIG. 1 is a partial perspective view of one typical installation for the emergency switch of the invention;

FIG. 2 is a perspective view of the switch of the invention; and,

FIG. 3 is an enlarged exploded perspective view of the switch of the invention.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings, and are not intended to define or limit the scope of the invention.

Referring now to the drawings in detail, it will be observed that one typical installation for the emergency power plant cut off system of the present invention is shown including a marine vehicle such as the motor driven boat 10 having an outboard engine as shown in FIG. 1 to which the cut off device 14 is electrically connected. The cut off device 14 may be mounted in fixedly spaced relation to the power plant at any desired location in the vehicle convenient to the operator 16. Cut off actuating facilities generally referred to by reference numeral 18 may then be anchored to the operator so that if and when the operator is unintentionally thrown from the boat or vehicle, the cut off actuator 18 is pulled free of the cut off device 14. The cut off device 14 is acutated so as to promptly disable operation of the power plant and thereby avoid unnecessary damage to the vehicle or boat 10 and to other vehicles of persons that could otherwise be damaged or injured by collision. About the same time as the operation of the boat is being disabled, the cut off device 14 completes a second circuit so as to activate audio means 12 which is part of a secondary circuit that is completed by the cut off switch.

As shown in FIG. 2, the cut off device 14 has a cut off actuator 18 which includes a flexible cable or cord 20 having an attachment means 21 at one end for attachment to the operator 16. At the other end, the attachment means 21 is connected to a U-shaped member or holding means 22 which is removably connected to a plunger 24. The plunger 24 is mounted for limited movement within an insulating housing having two pairs of electrical contacts 26a, 26b and 27a, 27b at its end. Advantageously, a drain opening 34 is provided to remove water from within the housing.

Referring to FIG. 3, it will be noted that the housing comprises a non-conductuve cylindrical member 40 having an enlarged base 41 in which the drainage aperture 34 is found. A protective sleeve 33 is threaded onto the cylindrical member 40. The plunger 24 is within the member 40 with its enlarged head 25 limiting the movement of the plunger 24 into the cylindrical member 40. The plunger 24 is provided with an O-ring 28 which sits in a recess. The O-ring 28 ensures a tight fit of the plunger 24 within the member 40.

With the plunger 24 being fully inserted in the member 40, a sleeve assembly 42 having a flange 45 and side contact terminals 27a, 27b is mounted within the enlarged portion 41. An end portion 38 depends from a shoulder 37 of the plunger 24, which is now located within the sleeve housing 42, is provided a contact washer or disk 30 which is held in place by O-ring 31 and retainer 32. A compressed spring 29 is provided within the enlarged portion 41 which rests at one end on the shoulder 36 of the plunger 24. The spring 29 acts on the contact disk 30 to urge the plunger 24 forward and the disk 30 out of contact with terminals 27a, 27b. Mounted on the end of the switch 14 is a rear housing assembly 46 with contact terminals 26a, 26b that are in contact with the disk 30 in its forward position. Contact of disk 30 with terminals 26a, 26b completes an electrical circuitry for activation of accessory apparatus. Contact of disk 30 with terminals 27a, 27b closes the circuit to the motor and makes the motor operational. The terminals 26a, 26b are for a secondary circuitry which may include audio or visual means.

In operative condition the terminals 27a, 27b are used to complete the electrical circuitry to the power plant or motor similar to that described in the aforementioned U.S. Pat. No. 3,210,494. To maintain the operative condition of U-shaped member 22 is placed about the plunger 24 between the head 25 and the O-ring 28. The removal of the U-shaped member 22 causes the plunger 24 to move forward and results in the disk 30 containing terminals 26a, 26b to complete the secondary circuit while breaking the first circuit.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. A safety switch for a motor vehicle, comprising:
    an enclosure, said enclosure comprising first and second switch terminal pair means, said first switch terminal pair means connected to first electrical circuit means, said first electrical circuit means disabling operation of the motor of said motor vehicle, and second switch terminal pair means connected to second electrical circuit means, said second electrical circuit means activating a sensory alarm means;
    switch contactor means mounted in said enclosure for movement between a first position in which said switch contactor means electrically connects said first switch terminal pair means, and a second position in which said switch contactor means electrically connects said second switch terminal pair means;
    biasing means for continuously biasing said switch contactor means into said second position;
    displaceable holding means for maintaining said switch contactor means in said first position; whereby said motor will operate and said sensory alarm means will be deactivated;
    means for attaching the displaceable holding means to a driver;

said displaceable holding means being displaced upon movement of said attachment means when said attachment means detects an abnormal condition of the driver;

whereby said biasing means biases said switch contactor means into said second position, said first electrical circuit means is opened thereby disabling operation of said motor, and said second circuit means is closed thereby causing actuation of said sensory alarm means.

2. The switch of claim 1, wherein said vehicle is a marine vehicle.

3. The switch of claim 1, wherein said sensory alarm means comprises at least one of an audio or visual signalling device.

4. The switch of claim 1, further comprising an aperture in said enclosure for draining liquids from asid enclosure.

5. The switch of claim 1, wherein said biasing means is a spring.

6. The switch of claim 1, wherein said displaceable holding means is a U-shaped member which substantially encircles said switch contactor means in said first position.

7. The switch of claim 6, wherein said U-shaped member detachably engages said switch contactor means.

8. The switch of claim 1, wherein movement of said switch contactor means is limited between said first and second positions.